(No Model.)
G. H. SMITH.
WHEEL HUB.
No. 454,688. Patented June 23, 1891.
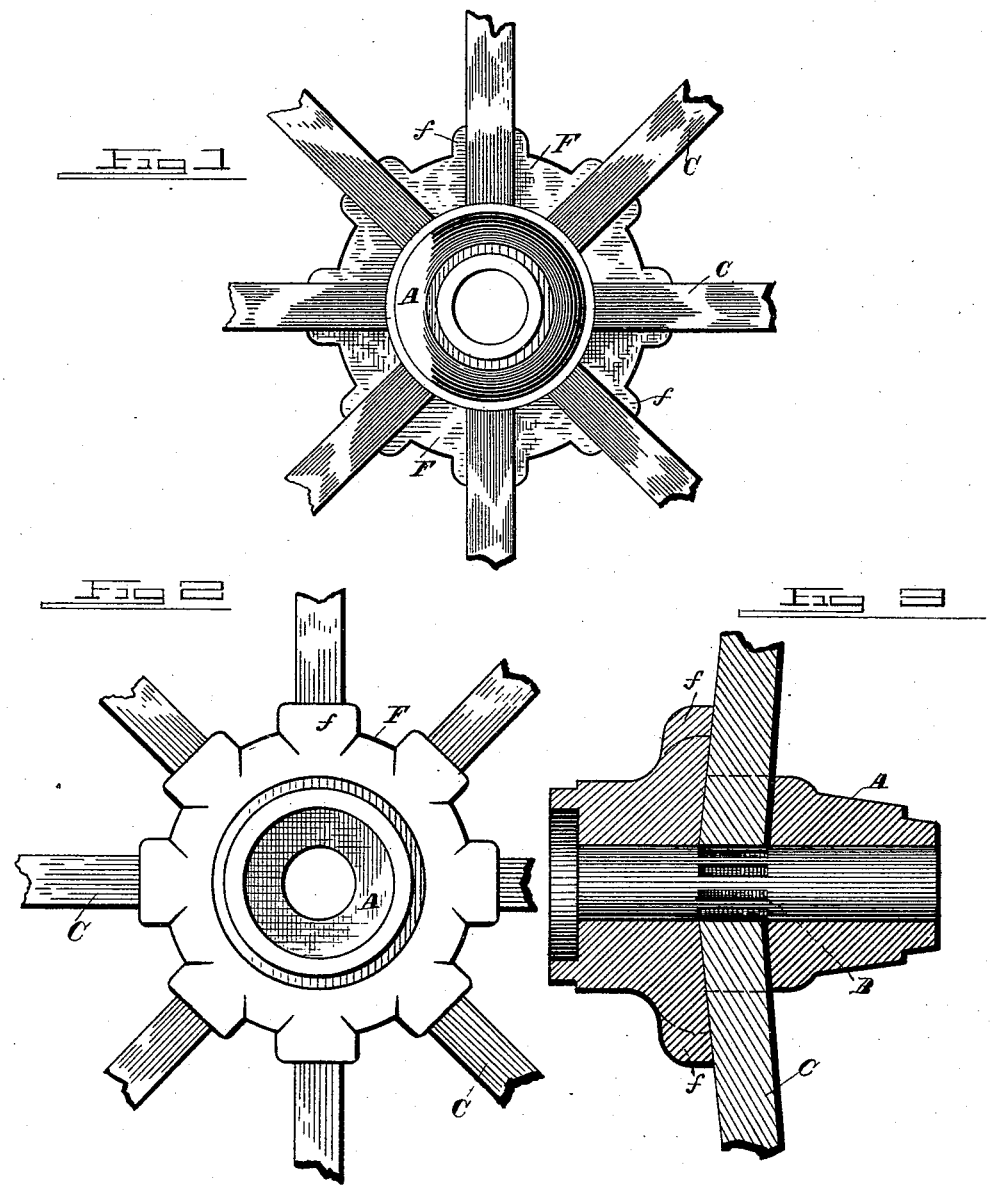
Witnesses
C. W. Seville.
Jas. L. Mansfield.
Inventor
George H. Smith.
By his Attorney
T. H. Alexander

UNITED STATES PATENT OFFICE.

GEORGE HENRISON SMITH, OF WEBSTER, WEST VIRGINIA.

WHEEL-HUB.

SPECIFICATION forming part of Letters Patent No. 454,688, dated June 23, 1891.

Application filed February 7, 1891. Serial No. 380,632. (No model.)

*To all whom it may concern:*

Be it known that I, GEORGE HENRISON SMITH, of Webster, in the county of Taylor and State of West Virginia, have invented certain new and useful Improvements in Wheel-Hubs; and I do hereby declare that the following is a full, clear, and exact description thereof, reference being had to the accompanying drawings, and to the letters of reference marked thereon, which form part of this specification, in which—

Figure 1 is a front face view of my improved wheel-hub. Fig. 2 is a rear view of the hub. Fig. 3 is a longitudinal sectional view thereof.

The present invention is an improvement in hubs for the wheels of road-wagons and machines, and it relates especially to the construction of the hubs, and its object is to prevent collapse of the wheel and to preserve the proper "dish" thereof; and to this end it consists in forming on the hub to the inner side of the spoke-mortises a large radiating flange, against which the spokes bear, as will be clearly understood from the following description and claims.

Referring to the drawings by letter, A designates a wheel-hub having spoke-mortises B B, in which are secured the spokes C, as usual, or in any convenient way.

D designates the fellies or rim secured to the spokes, and E the tire.

F designates a radial flange formed on the hub and projecting therefrom at the inner ends of the spoke-mortises B and bearing against the inner faces of spokes C, as shown, affording a support and brace for the spokes against inward or lateral thrust, so that if the wheel be running at an angle to a horizontal plane the lateral thrust on the spokes occasioned by the weight of the machine or wagon-body will be partially relieved by the said flange and transferred to the hub direct close to the axle and inner end of axle-skein. The flange may have a series of short radial fingers or projections $f$ on its periphery, which press against the spokes also and form braces therefor, as indicated. The flange and fingers are preferably dished on their outer faces corresponding to the dish of the wheel, so as to fit snugly against the spokes and maintain the dish of the wheel.

I am aware that hubs have been provided with flanges between which the spokes were inserted and clamped to secure them to the hub, and also that removable flanged hub-covering castings have been secured on the front ends of the hubs. Such I disclaim; but

What I claim as new is—

1. In a wheel, the combination of the spokes and rim with a hub having a single projecting flange in rear of the spokes, provided with integral radiating fingers or projections on its periphery, against which the inner faces of the spokes bear, substantially as set forth.

2. The herein-described hub for wagon-wheels, having spoke-mortises, and a single deep radial flange F projecting from and formed integral with the hub at the rear ends of the mortises and adapted to brace the spokes against lateral inward thrust, substantially as specified.

In testimony that I claim the foregoing as my own I affix my signature in presence of two witnesses.

GEORGE HENRISON SMITH.

Witnesses:
 JNO. P. HERR,
 I. WILMOTH.